United States Patent [19]

Brown et al.

[11] 4,208,028
[45] Jun. 17, 1980

[54] SUPPORT APPARATUS

[75] Inventors: Garrett Brown, 508 Pine St., Philadelphia, Pa. 19106; Arnold O. DiGuilio, Sherman Oaks, Calif.

[73] Assignee: Garrett Brown, Philadelphia, Pa.

[21] Appl. No.: 700,544

[22] Filed: Jun. 28, 1976

Related U.S. Application Data

[63] Continuation-in-part of Ser. No. 506,326, Sep. 16, 1974, Pat. No. 4,017,168.

[51] Int. Cl.² .............................................. G03B 17/00
[52] U.S. Cl. .................................... 224/185; 352/243; 354/70; 354/82; 354/293; 248/280.1; 248/179; 248/123.1
[58] Field of Search ................... 352/243; 354/70, 81, 354/82, 293; 248/18, 123, 179, 183, 280, 281, 284; 244/5 R, 5 V, 185

[56] References Cited

U.S. PATENT DOCUMENTS

| | | | |
|---|---|---|---|
| 218,210 | 8/1879 | Alling et al. | 248/281 |
| 817,207 | 4/1906 | Wheeler | 354/82 |
| 991,101 | 5/1911 | Smith | 248/281 |
| 1,070,525 | 8/1913 | Pieper | 248/281 |
| 1,272,845 | 7/1918 | Peck et al. | 248/280 |
| 2,090,439 | 8/1937 | Carwardine | 248/280 |
| 2,506,228 | 5/1950 | Lofstrand | 248/123 |
| 2,506,228 | 5/1950 | Lofstrand | 248/123 |
| 2,552,205 | 5/1951 | Moss | 354/82 |
| 2,787,434 | 4/1957 | Jacobsen | 248/280 |
| 2,941,776 | 6/1960 | Lauterbach | 248/284 |
| 2,997,242 | 8/1961 | Grosholz | 239/281 |
| 3,041,060 | 6/1962 | Jacobsen | 248/280 |
| 3,103,257 | 9/1963 | Richards | 182/2 |
| 3,226,073 | 12/1965 | Jacobsen | 248/280 |
| 3,409,261 | 11/1968 | Leporati | 248/284 |
| 3,417,953 | 12/1968 | Hillquist et al. | 248/280 |
| 3,498,577 | 3/1970 | Mehr | 248/280 |
| 3,543,019 | 11/1970 | Jacobsen | 240/81 |
| 3,774,873 | 11/1973 | Krogsrud | 248/280 |

*Primary Examiner*—Monroe H. Hayes
*Attorney, Agent, or Firm*—Weiser, Stapler & Spivak

[57] ABSTRACT

A support apparatus for a portable weight such as a camera comprising at least a pair substantially friction-free arms which are rotatably and pivotally interconnected at a hinge bracket. One end of the interconnected pair of arms is rotatably and pivotally connected to a mount which may be worn by an operator or attached to a movable support. The other end is adapted to carry a weight such as a camera.

Each arm is parallelogram in configuration and is provided with a segmented spring designed to apply a constant force to compensate for the weight applied to the end of each arm. The segmented spring acts as a single spring mounted diagonally across the parallelogram and exerts a force which is equal to the weight applied to the end of the parallelogram arm times the length of its diagonal divided by the distance between the attachment points of the parallelogram to the hinge bracket.

In operation, the weight carried by the support apparatus is spacially decoupled from the mount to increase isolation of the weight from the operator or support.

59 Claims, 9 Drawing Figures

SUPPORT APPARATUS

This is a continuation in part of application Ser. No. 506,326, filed Sept. 16, 1974, now U.S. Pat. No. 4,017,168.

FIELD OF INVENTION

This invention relates to equipment supports and more particularly pertains to portable equipment utilized in conjunction with motion picture or television cameras.

DESCRIPTION OF THE PRIOR ART

In taking photographs with a strip film fed motion picture camera or when employing a video tape type of camera, it is extremely important that the camera be maintained in as stable a position as possible in order to obtain high quality results. Such stability commonly has been achieved by mounting the camera on a tripod or otherwise supporting the camera, either video tape or motion picture type, on a stationary support so as to eliminate any possibility of the undesirable camera motion. Problems generally arise when it is desired to take motion pictures under conditions wherein it is necessary or desirable that the camera itself be mobile or be moved during the photographic process. In such procedures, it has been the usual prior art practice generally to mount the camera on a wheeled dolly, sometimes running on temporary tracks or on a constructed platform extending along the intended path of movement, thereby permitting the camera equipment to be moved along a smooth path. When it has been necessary or desirable to employ a hand-held camera, high quality results have generally been unobtainable when the cameraman walks or runs with the camera because of the attendant increase in instability, particularly the quick angular deviations along the axes of pan, tilt and roll, which cannot be adequately controlled. Such instability has heretofore been characteristic of hand-held motion picture photography.

In order to overcome the problems encountered in hand-held cimematography and to reduce the great expense normally encountered in construction of temporary tracks or temporary platforms, prior workers in the art have attempted to develop portable camera stabilizing devices. One such device has been disclosed in the U.S. Pat. No. 2,945,428. It was found that the camera had little or no mobility relative to the cameraman and that such devices required that the cameraman have his eye directly adjacent to the camera to properly direct the camera lens toward the object. These factors tend to limit the versatility of camera angles or types of shots which can be made with such devices. Furthermore, when the cameraman's body is in contact with the camera, his motions are directly transmitted to the camera resulting in jitter. Other prior workers in the art have attempted to solve the problem by employing gyro stabilizers and lens constructions which adjust the light paths entering the camera in order to produce a stabilized image. These devices also require that the camera be mounted in a relatively fixed position with respect to the cameraman. The prior art devices tend to restrict the speed of panning and tilting that can be achieved and are further deficient in that they introduce other arbitrary motions of their own if their inherent limits are exceeded by walking or running. Further, the prior art devices insofar as is known without exception, are of little benefit to translational stability or motion about the axis passing through the camera's lens. All of the prior art stabilizing devices of which we are familiar require the addition of considerable weight beyond that of the camera itself thereby introducing a factor directly relating to the strength of the cameraman himself. The foregoing factors tend to limit the versatility of prior art devices by limiting the camera angles and the type of shots which can be achieved by utilizing such equipment.

None of the prior art devices has been completely successful because of the lack of one or more of the requirements met by the present invention, namely:

1. inherent stability, that is, the tendency to resist the rapid angular motions around all three possible axes that plague hand-held shooting, and slow them down to the point that the human body can effectively deal with without introducing new ones;

2. perfect floatation and isolation, that is, relieving the cameraman of the necessity of exert force to support the camera, thus preserving the delicacy of touch required for fine control of the camera's motions and decoupling the camera from the cameraman's motions; and 3. minimum increased weight, that is, eliminating the need for balancing counterweights, particularly in the case of the heavier 35 mm motion picture camera and video cameras.

In U.S. Patent application Ser. No. 506,326, filed by the assignee of the present application, is disclosed a solution to the above given difficulties.

One disadvantage noted in the function of the support arms of Ser. No. 506,326 was the possibility of the forearm acting out of synchronism with the rear arm since the device could operate only in one plane. It was possible for the forearm parallelogram to close while the upper arm was not yet closed. This severely restricted the range of operation. If it was attempted to raise the camera in a position close to the operator's body, it was found that there was an arc in which the arms could not function. It was then necessary to first push the camera forwardly as it was raised and then to pull the camera rearwardly.

Additionally, it was found that the weight was exactly in equilibrium with the upward force of the arms in only one position within the range of operation.

Accordingly, it is a general object of the present invention to provide an improved support for a weight such as a portable camera.

It is another object of the present invention to provide a support for a portable camera carried by an ambulatory cameraman which exactly compensates for the weight of the camera throughout its entire range.

It is still another object of the present invention to provide a support for a portable camera that is rugged in construction, inexpensive to manufacture and trouble free when in use.

It is still another object of the present invention to provide a support for a portable camera which works equally well with motion picture cameras and television cameras.

It is also an object of the present invention to provide a support for a portable camera which decouples the camera from the motion of the means which the support is mounted on.

It is another object of the present invention to provide for the constant force throughout the entire operating range of the spring arm through a virtually friction-free structure.

SUMMARY OF THE INVENTION

In keeping with the principles of the present invention, the objects are accomplished with a unique support apparatus for a weight such as a portable camera comprising the unique combination of at least a pair of pivotably and rotatably interconnected arms, one end of which is pivotably and rotatably supported by a mounting means and the other end of which is arranged and configured to support a camera, and a spring means provided on each arm of the support apparatus to compensate for the weight applied to the end of each arm. In this manner the support arms and the pivotal and rotatable connections permit free floating of the camera and act to isolate the camera itself from the movements of the mounting means thereby preventing unwanted movement caused by the motion of the mounting means.

The pair of spring loaded support arms permit the load, such as an expanded camera, to essentially float freely in a manner to isolate the equipment from any movements of the operator. It will be noted that the equipment of the present invention functions to improve quality of results without adding significantly to the overall weight of the mobile equipment. The arms define parallelogram configurations wherein each parallelogram has a common side, comprising a hinged medial block or elbow.

The hinged elbow is employed intermediate the arms to allow the support arms to act more like the human arm and to follow closely the movements of the operator's arm. The present design allows the support arms to be considerably more flexible than the original design disclosed in Ser. No. 506,326 in which the arms could operate only in one plane, a vertical plane. A medial hinge bracket has been provided in place of the former medial block between the upper and lower arms. The medial hinge bracket operates to the left or the right only in a manner to follow the movements of the human arm.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DESCRIPTION OF THE PREFERRED EMBODIMENTS

Figures 1, 2:
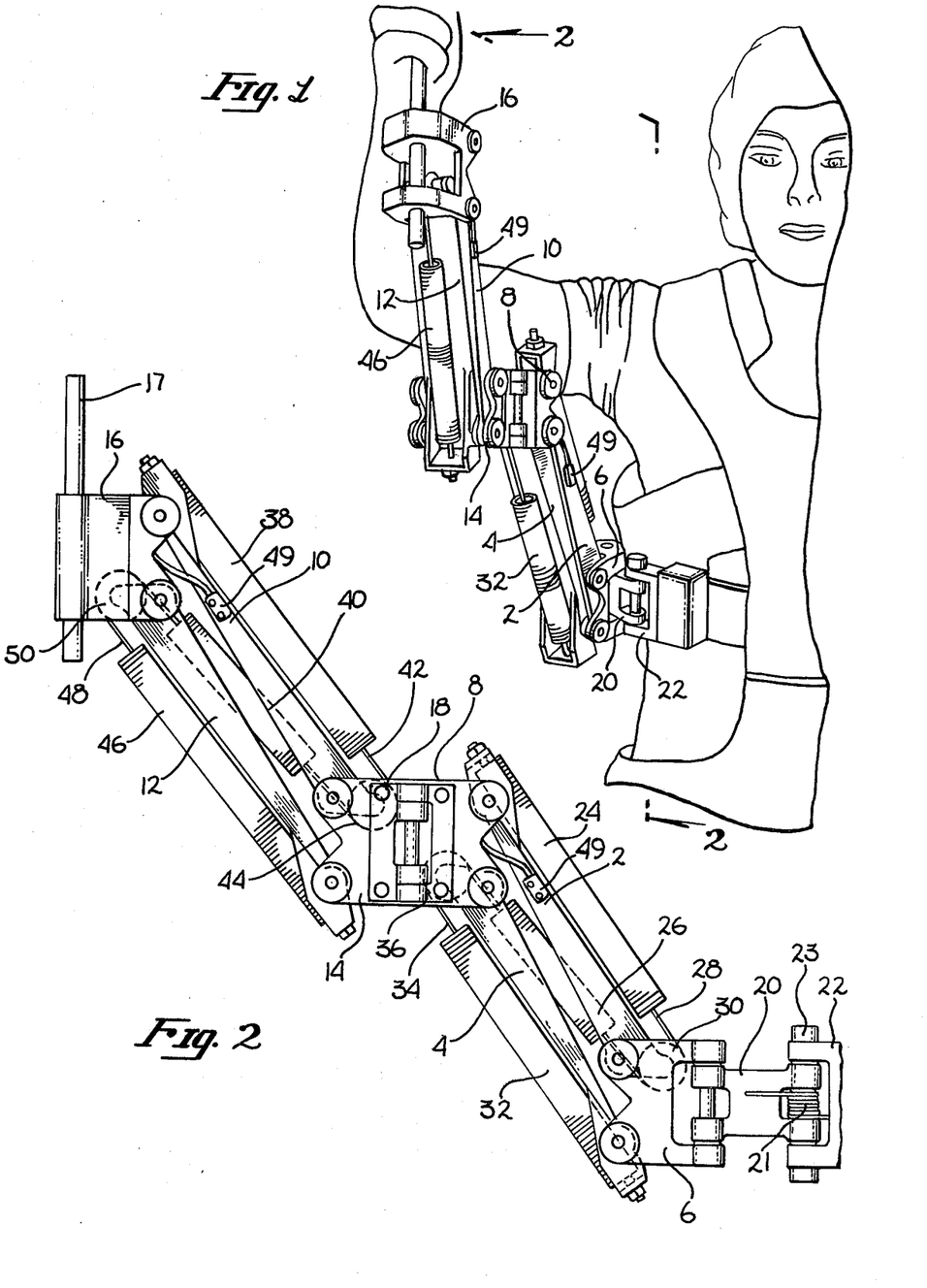
FIG. 1 is a perspective view showing the support apparatus in accordance with the teachings of the present invention in use but without a camera mounted thereon.
FIG. 2 is a side elevation view of the apparatus of FIG. 1 looking along the line 2—2.
Figure 3:
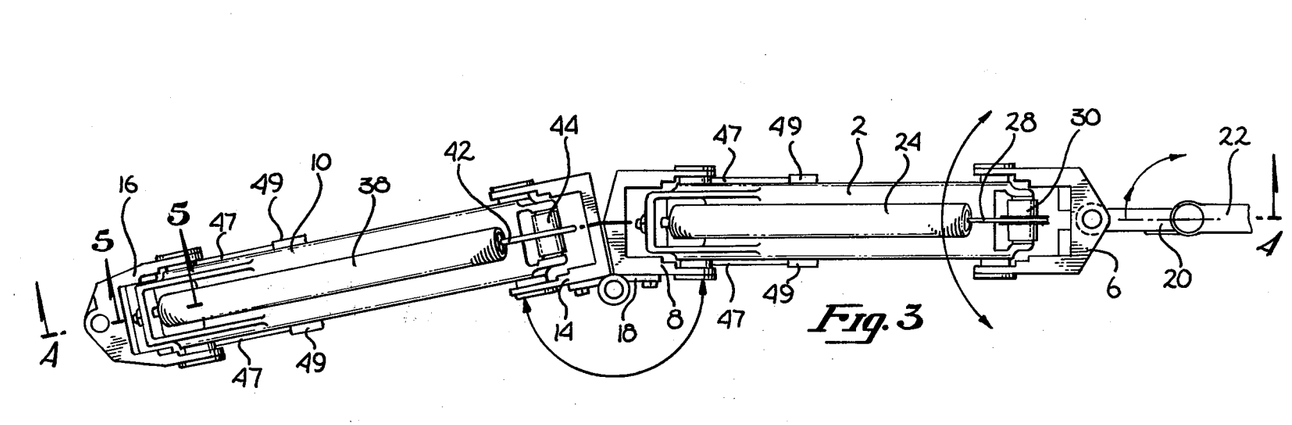
FIG. 3 is a top plan view of the apparatus of FIG. 1.
Figure 4:
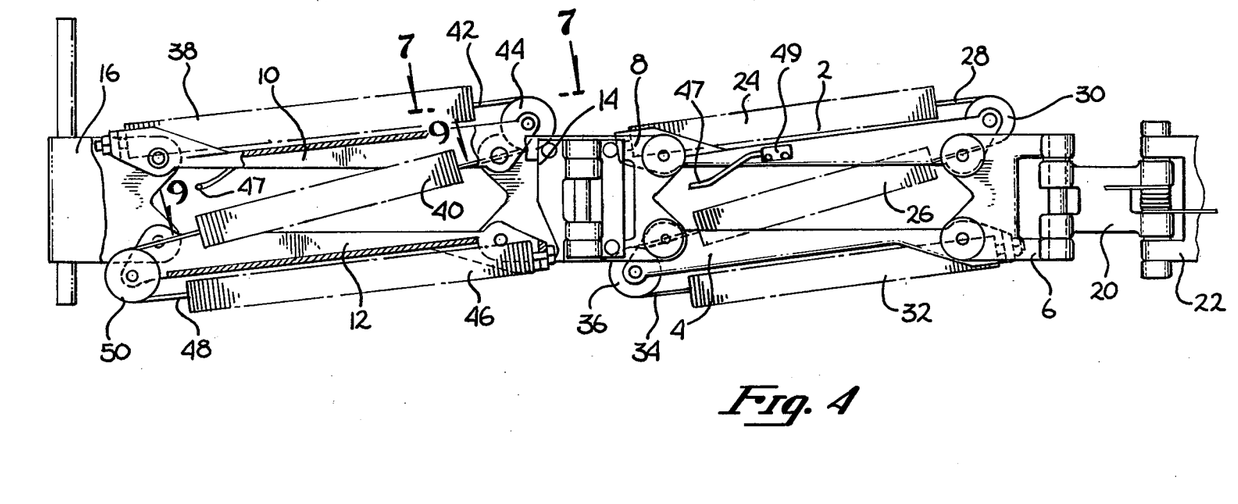
FIG. 4 is a partial sectional side view of FIG. 3 looking along the lines 4—4.

Referring to the drawings, FIGS. 1-7 illustrate one embodiment of a support for a weight such as a portable camera in accordance with the teachings of the present invention. FIG. 1 shows a perspective view of the support apparatus as attached to a support vest which is worn by a cameraman. The support apparatus as shown in FIG. 1 basically breaks down into five (5) portions. The first portion being that portion which is adapted to connect to the support vest. The second and third portions comprise the forearm and upper arm. The fourth portion consists of a rotatable and pivotal connection between the forearm and upper arm and the fifth portion consists of the end of the forearm which is arranged and configured such that a camera may be mounted thereon. The particular implementation of a support apparatus in accordance with the teachings of the present invention will now be hereinafter discussed in reference to FIGS. 2-7.

In FIGS. 2-7, the support apparatus includes a pair of parallel upper arm links 2 and 4. The upper arm links 2 and 4 are pivotally coupled at one end to connector hinge bracket 6. The other end of upper arm links 2 and 4 are pivotally coupled to upper arm medial hinge bracket 8. A second pair of parallel forearm links 10 and 12 are pivotally coupled respectively between forearm medial bracket 14 and camera support bracket 16. Camera mounting pin 17 is provided in camera support bracket 16. Upper arm and forearm medial brackets 8 and 14 are rotatably coupled together along one side by a hinge 18. Connector hinge bracket 6 is rotatably coupled at its center to one end of lower support hinge plate 20. The other end of lower support hinge plate 20 is rotatably coupled to fixed support block 22 by a pin 23. A spring 21 through which pin 23 extends biases plate 20 in a clockwise direction.

One end of tension spring 24 is coupled to the end of upper arm link 2 which is pivotally coupled to upper arm medial hinge bracket 8. The other end of tension spring 24 is coupled to one end of tension spring 26 by a section of cable 28 which passes over and around pulley 30 which is rotatably coupled to upper arm link 2. The other end of tension spring 26 is coupled to one end of tension spring 32 via a section of cable 34 which rides on and around pulley 36 which is rotatably coupled to upper arm link 4. The other end of tension spring 32 is coupled to the end of upper arm link 4 adjacent connector hinge bracket 6.

Similar to the above, one end of tension spring 38 is coupled to the end of forearm link 10 adjacent to camera mounting bracket 16. The other end of tension spring 38 is coupled to tension spring 40 via a cable 42 which rides on and around pulley 44 which is rotatably coupled to forearm link 10. The other end of tension spring 40 is coupled to one end of tension spring 46 via a cable 48 which rides on and around pulley 50 which is rotatably coupled to forearm link 12. The other end of tension spring 46 is coupled to the end of forearm link 12 adjacent forearm medial hinge bracket 14.

A weight, such as a camera which is supported at the support bracket 16 behaves as an object in free space beyond gravity since the upward forces which the tension springs 24, 26, 32, and 38, 40, 46 exert in effect counteract gravity. The weight tends to travel in a straight line until influenced otherwise and tends to retain the same angle until influenced otherwise. In the configuration shown, the upper arm links 2, 4 roughly correspond to the upper arm (not shown) of the user in terms of its three dimensional geometry as it is used either high, low, or to either side.

The foreman links 10, 12 roughly correspond to the forearm of the user and roughly follows a parallel course to the user's forearm. The lower support hinge plate 20 provides the function of compensating for the motions to the front and to the rear of the user's shoulder. The lower support hinge plate 20 also allows the operator's arm to operate in the correct position for right handed use and swing the entire support arm structure to the left to allow the arms to operate out in front of the body for left handed use. The support hinge plate 20 also permits use back close to the user's shoulder and roughly parallel to the user's arm for right handed use. The support hinge plate 20 compensates for the necessary distance or movement of the operator's shoulder as the upper arm links 2, 4 traverse forward and to the rear as the operator (FIG. 1) reaches forward and rearwardly.

The upper arm medial hinge bracket 8 allows the combined upper arm and forearm to act like the human arm and allows considerably more flexibility. The hinge bracket provides novel phenomenon which is unexpected. The human arm (FIG. 1) can bend in only one direction and the hinged elbow allows duplication of this movement by the upper arm and forearm. The hinged elbow 8, 14, 18 permits the operation of the weight, such as a camera, to the right side of the user's body and close in with full up and down mobility without the arms locking. The hinged elbow 8, 14, 18 and the lower support hinge plate 20 permit the same up and down mobility directly in front of the operator as close as can be. The lower support hinge plate 20 compensates for the movements of the operator's shoulder.

The hinged elbow between two spring loaded parallelograms has no effect on their load bearing ability even as the hinge 18 is deployed throughout its entire range.

Furthermore, a snubber spring 47 and snuber spring mounting block 49 are provided on both sides of the upper ends of forearm link 10 and upper arm link 2. The snubber spring 47 and snubber spring mounting block 49 are arranged and configured such that at the upper limit of movement of the support apparatus the snubber springs engage with upper arm medial hinger bracket 8 and camera mounting bracket 16 and at the lower limit of movement engage with the top edge of upper arm link 4 and forearm link 12. The snubber springs 47 exert a counteractive force at the extremities of movement of the support apparatus to insure smooth operation of the upper arm and forearm over the full range of movement.

Figure 5:
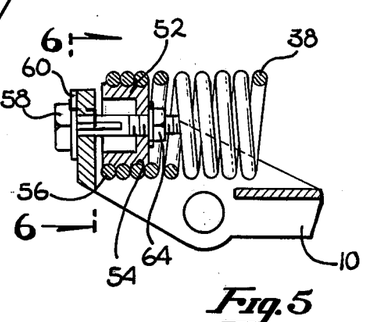
FIG. 5 is a partial sectional view of FIG. 3 looking along the lines 5—5.
Figure 6:
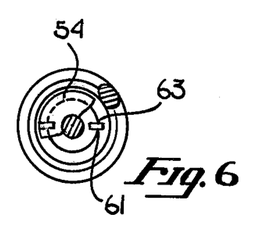
FIG. 6 is an enlarged partial sectional view of FIG. 5 looking along the lines 6—6.

The coupling of one end of the tension spring to a link will now be described in detail by referring to FIG. 5 and 6. In FIG. 5, the tension spring 38 is threaded onto a cylindrical block 52 having a helical groove pattern 54 formed in the outside cylindrical surface. A mounting bracket 56 is formed in the end of forearm link 10. Cylindrical block 52 is coupled to mounting bracket 56 by a bolt 58 which passes through washer 60, a hole in support bracket 56 and a hole in hollow cylindrical block 52. A nut 64 is swaged onto the end of the hollow cylindrical block 52 and threadedly receives the bolt 58 to secure the parts. Furthermore, washer 60 has two fins 61 projecting axially from it surface which pass through two slots 63 in bracket 56 and engage two slots 65 on the inner cylindrical surface of block 52 thereby preventing rotation of block 52. Furthermore, as a result of swaging nut 64 being nonrotatably coupled to hollow cylindrical block 52, the tension on the spring assembly can be adjusted by rotating bolt 58 clockwise or counterclockwise.

Figure 7:
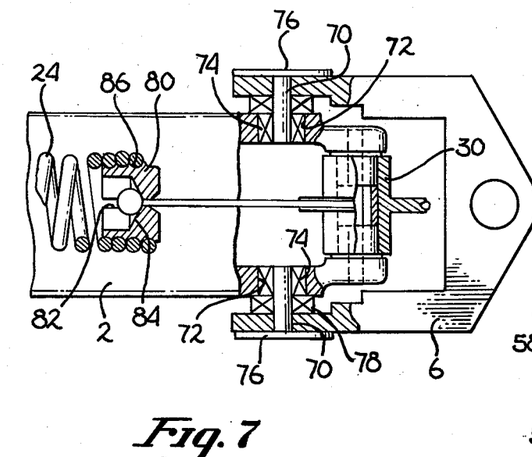
FIG. 7 is an enlarged partial sectional view of the apparatus as shown in FIG. 4 looking along the lines 7—7.

Referring to FIG. 7, shown therein is an example of a low friction self-centering rotatable coupling between a link and a bracket. In particular, connector hinge bracket 6 is provided with pairs of opposing holes 70. Link 2 is provided with pairs of opposing holes 72 into which bearings 74 are mounted. A pair of coupling pins 76 are inserted through holes 70 in connector hinge bracket 6 and into bearing 74 mounted in hole 72 of arm 2. In order to eliminate any sliding friction between arm 2 and connector hinge bracket 6 and to maintain the link 2 in a fixed position, a pair of thrust bearings 78 is provided between the inside surface of connector hinge bracket 6 and the outside surface of upper arm link 2. In this manner, the rotational friction between connector hinge bracket 6 and upper arm link 2 is kept to a minimum.

Referring further to FIG. 7, shown therein is a means for connecting the cable to one end of the tension springs. The means for coupling the cable to one end of the tension springs consists of a cylindrical hollow block 80. The hollow cylindrical block 80 is further provided with a slot 82 which extends from the side of the cylindrical block 80 to its center. The bottom inside surface of hollow cylindrical block 80 is further provided with a conical depression 84 and a helical groove 86 is formed in the outside surface of hollow cylindrical block 80.

To couple the cable to the spring, first the cable having a ball fixed to its end is slipped into the slot 82 in hollow cylindrical block 80. The ball fixed to the end of cable 28 fits into conical depression 84 thereby holding the cable in the center of the cylindrical hollow block 80. Spring 24 is then threaded onto the helical groove 86 formed in the outside surface of hollow cylindrical block 80.

In practice the length of the support apparatus should be approximately equal to the length of the arm of a cameraman. Furthermore, the bearings 78 and 74 may be any type of low friction bearing which exists in the art and which performs the desired function. In addition, the support may be made up of any number of arms greater than one (1) arm. Furthermore, the camera may be similar to the expanded camera disclosed in U.S. Patent application Ser. No. 506,306 filed Sept. 16, 1974.

In operation, the segmented spring comprising tension springs 24, 26, and 32 interconnected by cables 28 and 34 act together as a single tension spring mounted diagonally across the parallelogram formed by upper arm links 2 and 4 and connector hinge bracket 6 and upper arm medial hinge bracket 8. This equivalent tension spring exerts a force which is equal to the weight applied to the end of the parallelogram times the length of the diagonal of the parallelogram along which the spring extends divided by the distance between the attachment points of links 2 and 4 on upper arm medial hinge bracket 8. Accordingly, the equivalent diagonal tension spring exerts a force which exactly compensates for the weight applied to the end of the parallelogram regardless of how the parallelogram is moved in a vertical plane. Therefore, once the equivalent tension spring is adjusted to compensate for the weight applied to the end of the parallelogram, in this case to the upper arm medial hinge bracket 8, it will exactly compensate for this weight at all angles of movement. For the parallelogram consisting of upper arm links 2 and 4 and connector hinge bracket 6 and upper arm medial hinge bracket 8, the weight applied consists essentially of the remainder of the support apparatus plus the weight of the camera.

Similarly to that previously described, the segmented spring consisting of tension springs 38, 40 and 46 interconnected by cables 42 and 48 act as a diagonal tension spring extending across the diagonal parallelogram consisting of forearm links 10 and 12 and forearm medial bracket 14 and camera support bracket 16. For the parallelogram consisting of links 10 and 12 and forearm hinge bracket 14 and camera support bracket 16, the weight applied consists substantially of the weight of the camera mounted on the camera support bracket 16.

Furthermore, at the extremities of movement of the support apparatus there are large moments applied to the ends of the forearm and upper arm which tend to distort the parallelogram. Since there are these large moments, snubber springs 47 are provided to exert a counteractive force at the extremities of movement of the support apparatus to prevent distortion of the parallelogram and insure smooth operation over the full range of movement.

Since as previously described, the weight applied to each section of the support apparatus is exactly compensated by that sections equivalent diagonal spring, the weight of the camera fixed on camera support bracket 16 is exactly compensated at all positions of the support apparatus. Furthermore, since the weight of the camera is compensated for at all positions of the support apparatus and there is a very small amount of friction in the linkage of the support apparatus, substantially none of the motion of the cameraman is transmitted to the camera as a result of the camera's own inertia. Therefore, it is possible for the cameraman to move up and down without affecting the position of the camera mounted on the support apparatus. To provide for motion in the horizontal plane, hinge 18 allows the upper arm and forearm section of the support apparatus to rotate relative to each other as shown by the curved arrow in FIG. 3. Furthermore, the support apparatus may rotate relative to the cameraman at the rotational connection at the connector hinge bracket 6 and lower support hinge plate 20. As a result of this allowable movement and in particular the movement of the upper section relative to the lower section, the mobility of the cameraman is increased.

Figure 8:
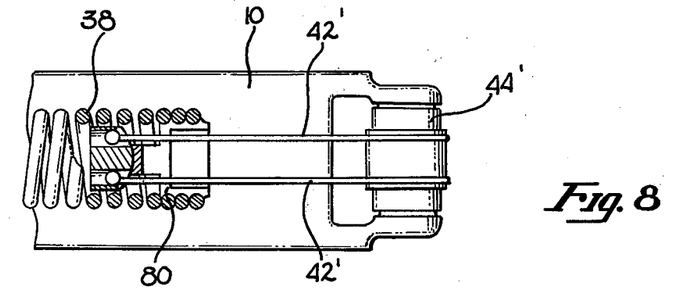
FIG. 8 is a modified partial sectional view of an alternate arrangement of the apparatus as shown in FIG. 4 looking along the lines 7—7.
Figure 9:
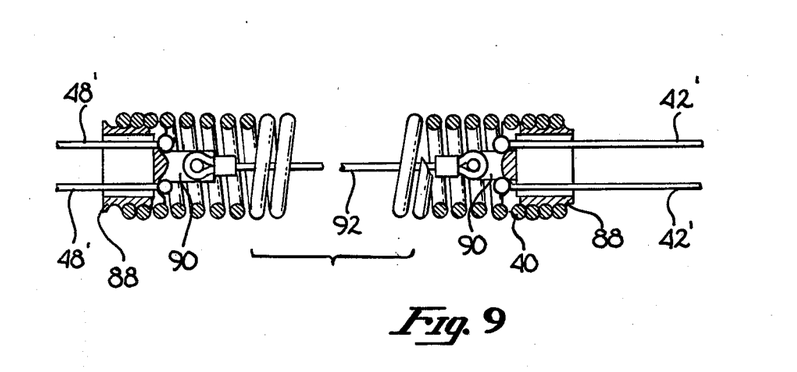
FIG. 9 is a modified enlarged partial view of the apparatus as shown in FIG. 4 looking along the lines 9—9.

For those situations where the camera is very heavy, it may be desirable to modify the support apparatus as shown in FIGS. 8 and 9. In this modification the single cable 42 between the tension springs is replaced by a double cable 42'. Since there are two cables 42', the pulley 44 must be modified as shown by the pulley 44' in FIG. 8 to accommodate the two cables 42'. Furthermore, the cylinderical block which couples the cables to the tension spring 38 must also be modified to two cables as shown by the cylinderical block 80'.

In particular, the cylinderical block 80' is provided with a concave seat 81 which engages with rocker 83. The rocker 83 engages with the balls on the ends of cables 42' and compensates for the variations which occur in cable length, thereby insuring that the load is divided equally between the cables 42'.

Referring to FIG. 9, shown therein is a modified form of the diagonal spring 40 with the additional modification of a safety cable. In FIG. 9 the cylindrical blocks 88 are provided not only with a means for coupling the cables 42' to the block 88 and a helical groove onto which the tension spring 40 is threaded, but also a projection 90 to which a safety cable 92 is attached. In this way if the tension spring 40 were to break or to become disconnected from the hollow cylindrical block 88, the safety cable 92 would prevent the spring from flying off and causing injury to someone and also would prevent the total collapse of the support apparatus. Furthermore, it should be apparent that the spring 26 could be modified in a similar manner as the spring 40 shown in FIG. 9.

Furthermore, it should be apparent to one skilled in the art that the above described support apparatus could be coupled to any means of support other than a cameraman; i.e. a car, horse, airplane, etc.. In addition, the support apparatus could be used to support many other devices besides a camera; i.e. a weapon, an instrument, etc.. Also, it should be apparent that any configuration of springs whether internal or external which exerts the desired force on the diagonal of the parallelogram would operate equally as well as that described.

In all cases it is understood that the above described embodiments are merely illustrative of but a small number of the many specific embodiments which can represent applications of the principles of the present invention. Numerous and varied other arrangements can be readily devised in accordance with these principles by those skilled in the art without departing from the spirit and scope of the invention.

We claim:

1. A weight support apparatus system especially adapted for operation as a portable device on a moving carrier and capable of being hand-guided by an operator, the system being of improved stability against angular deviations in pan, tilt and roll, and substantially free-floating in a manner to also isolate the weight from unwanted lateral and vertical movement caused by the motion of the carrier which comprises;

weight support means connected to and adapted to support at least part of the weight, which means is adapted to be connected to the carrier, said support means substantially freeing the operator's hands from the weight, isolating and free-floating the weight at a distance from the operator substantially independently of any of his unwanted lateral and vertical motions and capable of being guided to a position in space and in a range of positions selected by the operator;

said support means comprising at least a pair of first and second interconnected equipoising parallelogram linkage support arms, said support arms being adapted to damp out vibrations due to movement of the carrier; and pivotal and rotatable means interconnecting the support arms to permit rotatable and pivotable movement of one arm relative to the other.

2. The support apparatus system of claim 1 wherein the weight support means comprises hinge plate means at the end closest the carrier for rotatable movement of the support means relative to the carrier.

3. The support apparatus system of claim 2 wherein the hinge plate means comprises means to urge the end of the hinge plate farthest from the operator in an arc away from the center of the operator's chest.

4. The support apparatus system of claim 2 wherein the hinge plate means comprises a spring means, said spring means continuously biasing the hinge plate means in an arc away from the center of the operator's chest.

5. The support apparatus system of claim 2 wherein the hinge plate means comprises a second means for second rotatable movement of the support arms relative the carrier.

6. The support apparatus system of claim 2 which comprises a vest adapted to be worn by the operator.

7. The support apparatus system of claim 6 wherein the support means is connected to the vest said interconnection between the support means and the vest being adapted for both pivotal and rotatable movement relative to the operator.

8. The support apparatus system of claim 1 wherein the support means comprise means which counteract the force of gravity upon the weight, thus counterbalancing the pull downward of the weight.

9. The support apparatus of claim 2 wherein at least one of the support arms comprises an upper longitudinal link and a lower longitudinal link, which links form legs of a parallelogram.

10. The support apparatus system of claim 10 wherein the first support arm comprises a first resilient means, said first resilient means continuously biasing the end of the first arm that is remote from the carrier upwardly relative to the carrier, the bias of the first resilient means being substantially balanced by the weight to cause the weight to free float irrespective the movement of the carrier.

11. The support apparatus system of claim 10 wherein the second support arm comprises a second resilient means, said second resilient means continuously biasing the end of the second arm which is remote from the carrier upwardly relative to the carrier, the bias of the second resilient means being substantially balanced by the weight to cause the weight to float free irrespective the movement of the carrier.

12. The support apparatus system of claim 1 which comprises a first and second spring means biasing the first and second arms respectively relative to the carrier, whereby the weight is counteracted by the bias of the first and second spring means.

13. The support apparatus system of claim 12 wherein the parallelogram linkage comprises links which are adapted to be pivoted as the weight is raised and lowered and the first and second spring means are adapted to pivot the first and second arms about any of their respective pivots in the same direction relative to the carrier.

14. The camera equipment system of claim 1 wherein the pair of arms comprise an upper arm and a forearm, said arms being in longitudinal juxtaposed relationship.

15. The support apparatus system of claim 14 wherein the support arms are interconnected at the pivotal and rotatable means.

16. The support apparatus system of claim 1 wherein the first of the support arms comprises a plurality of substantially frictionless pivots, whereby the first arm may be moved pivotally relative to the carrier and the pivots do not contribute to counteract the weight.

17. The support apparatus system of claim 16 wherein the second of the support arms comprises a plurality of substantially frictionless pivots, whereby both support arms may be moved pivotally relative to the carrier and the pivots do not contribute to counteract the weight.

18. The support apparatus system of claim 1 wherein the support means comprises a plurality of substantially frictionless pivots.

19. The support apparatus system of claim 1 wherein the weight which is transmitted to the pivotable and rotatable means is counterbalanced in a vertical direction by the support means without lateral resistance to movement.

20. The support apparatus of claim 19 wherein the pivotable and rotatable means is adapted to be substantially friction-free.

21. The support apparatus system of claim 1 wherein the weight is removably affixed to the weight support means.

22. The support apparatus system of claim 1 wherein the support means supports the weight without the assistance of a counterweight.

23. The support apparatus system of claim 10 wherein the first resilient means comprises means which is expandable and compressible to continuously bias the arm end remote from the carrier upwardly relative to the carrier.

24. The support apparatus of claim 9 wherein at least some of the legs of the parallelogram are interconnected by pivots.

25. The support apparatus of claim 24 wherein the pivots are substantially friction free.

26. A support apparatus according to claim 10 wherein said first resilient means comprises a plurality of tension springs, said tension springs being coupled together by non-elastic members.

27. A support apparatus according to claim 26 wherein said non-elastic members are cables and wherein each of the support arms comprise an upper longitudinal link and a lower longitudinal link, which links form legs of a parallelogram configuration, said links being interconnected by pivots.

28. The support apparatus of claim 13 wherein the pivotal and rotatable means comprises a medial hinge bracket.

29. The support apparatus of claim 28 and means to exert a counteractive force at the extremities of movement of the support means to insure smooth operation over the full range of movement.

30. The support apparatus of claim 29 wherein the means to exert comprises a snubber spring and wherein the first support arm comprises upper and lower longitudinal links, the said snubber spring being adapted to bias against one of the links at the lower limit of movement of the support apparatus.

31. The support apparatus of claim 30 wherein the snubber spring connects to an upper link and wherein the snubber spring is adapted to bias against the lower link of the first support arm at the lower limit of movement of the support apparatus.

32. The support apparatus of claim 29 wherein the means to exert comprises a second snubber spring interacting between the upper and lower longitudinal links of the second support arm.

33. A support apparatus according to claim 27 wherein said first resilient means comprises at least one pulley to rotatably support a said cable.

34. The support apparatus of claim 33 wherein the first resilient means comprises two pulleys, one pulley being connected to each said link, the pulleys being positioned at the opposite ends of the first support arm.

35. The support apparatus of claim 33 wherein the first resilient means exerts a force along the diagonal of the parallelogram configuration and wherein the force is equal to the weight applied to the end of the parallelogram times the length of the diagonal of the parallelogram divided by the distance between the pivots of the links of said parallelogram.

36. The support apparatus of claim 26 wherein said coupled together springs are connected at the ends thereof respectively to a link at the opposite ends of the first support arm.

37. The support apparatus of claim 36 wherein the connection of the spring end to a link comprises means to adjust the spring bias.

38. The support apparatus of claim 37 wherein the means to adjust comprises a mounting bracket formed in a link, a block connected to the end of the spring and a length adjusting member adjustingly securing the block to the bracket.

39. The support apparatus of claim 38 wherein the means to adjust further comprises means to prevent rotation of the block relative to the bracket.

40. The support apparatus of claim 26 wherein the connection between a non-elastic member and a spring comprises a block connected to a spring, a ball connected to the non-elastic member and means to interconnect the ball and the block.

41. The support apparatus of claim 36 and a safety cable adapted to prevent a spring from moving outwardly from its associated arm in the event of spring or cable breakage.

42. The support apparatus of claim 41 wherein at least a part of the safety cable is positioned interiorly of a spring.

43. The support apparatus of claim 40 and a safety cable adapted to prevent a spring from moving outwardly from its associated arm in the event of spring or cable breakage.

44. The support apparatus of claim 43 wherein the safety cable connects to the block.

45. The support apparatus of claim 44 wherein at least part of the safety cable is positioned interiorly of a spring.

46. A support apparatus according to claim 9 wherein said rotatable means forms another leg of said parallelogram.

47. A support apparatus for supporting a portable device on a moving carrier comprising:
at least a pair of arms wherein at least one of said arms comprises a pair of parallel links and pivotal means interconnecting the links;
a means for rotatably and pivotally coupling together said pair of arms;
a means for rotatably coupling one end of said coupled together arms to a support;
a means for rotatably and pivotally coupling the other end of said coupled together arms to the device to be supported;
said links, the means for rotatably and pivotally coupling together said pair of arms, said means for rotatably coupling one end of said arms to a support and the means for rotatably and pivotally coupling the other end of said coupled together arms to the device forming at least one parallelogram and
a compressible and expandable means provided on at least one of said arms and exerting a force across said parallelogram which compensates for the weight applied to the other end of said coupled together arms.

48. A support apparatus according to claim 47 wherein the force exerted by said compressible and expandable means is equal to the weight applied to the end of said parallelogram times the length of the diagonal of said parallelogram divided by the distance between the said links of said parallelogram.

49. A support apparatus according to claim 47 wherein said compressible and expandable means comprises a plurality of tension springs, said tension springs being coupled together by non-elastic members and said coupled together springs being coupled at each end thereof to said links at opposite ends of at least one said arm.

50. A support apparatus according to claim 49 wherein said compressible and expandable means comprises at least one pulley means provided on each of said links at opposite ends of a said arm, said pulleys rotatably supporting said non-elastic members.

51. The support apparatus of claim 47 wherein the pivotal means is adapted to be substantially friction-free.

52. A support apparatus according to claim 47 wherein said means for coupling one end of said coupled together arms to a support comprises:
a support vest arranged and configured to be worn by an operator; and
a link means interconnecting said end of the coupled together arms and the support vest.

53. A support apparatus according to claim 47 wherein said means for rotatably and pivotally coupling together said pairs of arms comprises a hinge.

54. A support apparatus according to claim 49 comprising at least two cables coupling together at least one pair of said tension springs.

55. A camera support apparatus according to claim 54 with compensating means to ensure that the load is divided equally between cables.

56. A support apparatus according to claim 54 comprising at least two pulley means provided on each of said links at opposite ends of at least one of said arms, said pulley means rotatably supporting said cables.

57. A support apparatus according to claim 47 wherein the compressible and expandable means is provided with a safety cable, said cable being adapted to prevent disassociation of the compressible and expandable means from the arm in the event of breakage.

58. The support apparatus of claim 57 wherein at least part of the safety cable is positioned interiorly of the compressible and expandable means.

59. A weight support apparatus system especially adapted for supporting a portable device on a moving carrier, the system supporting the device with improved stability against angular deviations in pan, tilt and roll in a substantially free-floating manner to also isolate the device from unwanted lateral and vertical movement caused by the motion of the carrier which comprises:
a pair of interconnected, equipoising, parallelogram linkage, support arms, said interconnected support arms having a first end adapted to be connected to the carrier and a second end adapted to be connected to the device,
said support arms being adapted to damp out vibrations due to movement of the carrier;
first pivotal and rotatable means interconnecting the support arms, said first means being adapted to permit rotatable and pivotal movement of one arm relative to the other;

a compressible and expandable means provided on at least one of the arms and exerting a force across the diagonal of the parallelogram linkage, said force being sufficient to counteract the weight of the device applied at the said second end; and second pivotal and rotatable means interconnecting the said first end to the carrier, said second means being adapted to permit rotatable and pivotal movement of the interconnected arms relative to the carrier.

* * * * *